United States Patent
Rice

(10) Patent No.: US 6,678,288 B2
(45) Date of Patent: Jan. 13, 2004

(54) MULTI-APERTURE FIBER LASER SYSTEM

(75) Inventor: Robert R. Rice, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/166,272

(22) Filed: Jun. 10, 2002

(65) Prior Publication Data

US 2003/0227948 A1 Dec. 11, 2003

(51) Int. Cl.[7] .............................. H01S 3/30; H01S 3/10
(52) U.S. Cl. ............................................. 372/6; 372/23
(58) Field of Search ...................................... 372/6, 23

(56) References Cited

U.S. PATENT DOCUMENTS

| | | | | |
|---|---|---|---|---|
| 4,757,268 A | * | 7/1988 | Abrams et al. | 359/338 |
| 5,347,525 A | * | 9/1994 | Faris | 372/19 |
| 5,694,408 A | * | 12/1997 | Bott et al. | 372/6 |
| 5,717,516 A | * | 2/1998 | Klein et al. | 359/334 |
| 5,747,720 A | * | 5/1998 | Schnurr et al. | 89/1.11 |
| 5,774,490 A | * | 6/1998 | Miller et al. | 372/89 |
| 5,790,287 A | * | 8/1998 | Darcie et al. | 398/108 |
| 5,832,006 A | * | 11/1998 | Rice et al. | 372/3 |
| 5,847,816 A | * | 12/1998 | Zediker et al. | 356/5.09 |
| 5,905,586 A | * | 5/1999 | Even | 398/1 |
| 5,991,058 A | * | 11/1999 | Feuer et al. | 398/72 |
| 6,200,309 B1 | * | 3/2001 | Rice et al. | 606/10 |
| 6,219,360 B1 | * | 4/2001 | Komine | 372/9 |
| 6,366,356 B1 | * | 4/2002 | Brosnan et al. | 356/477 |
| 6,377,591 B1 | * | 4/2002 | Hollister et al. | 372/6 |
| 6,404,784 B2 | * | 6/2002 | Komine | 372/9 |
| 6,480,327 B1 | * | 11/2002 | Betin | 359/338 |

* cited by examiner

*Primary Examiner*—Paul Ip
*Assistant Examiner*—Phillip Nguyen
(74) *Attorney, Agent, or Firm*—Harness Dickey & Pierce P.L.C.

(57) ABSTRACT

A multi-aperture fiber laser system that includes a fiber amplifier laser engine having a tunable master oscillator, a wavelength selective beam router optically connected to the laser engine, and a plurality of beam directors optically connected to the wavelength selective beam router. The tunable master oscillator outputs a first optical signal selectively tuned to at least one specific wavelength. The wavelength selective beam router receives a plurality of second optical signals that have the same at least one wavelength of the first optical signal. The wavelength selective beam router then routes each second optical signal to one of the beam director assemblies based the wavelength of the second optical signals. Thus, the multi-aperture fiber laser system enables a single high power fiber amplifier laser engine to supply laser power to more than one beam director in a highly flexible and efficient manner.

22 Claims, 4 Drawing Sheets

MULTI-APERTURE FIBER LASER SYSTEM

FIELD OF INVENTION

The invention relates generally to the use of a dual clad high power fiber amplifier laser engine as a laser source. More specifically, the invention relates to supplying laser power to multiple beam directors using only one high power fiber amplifier laser source.

BACKGROUND OF THE INVENTION

Known advanced combat air, ground and sea based platforms use lasers systems for directed energy weapons. Generally, the laser systems include a laser engine and a beam director aperture, or assembly, that directs and controls the beam being output. Typically the field of view for a specific radiating beam director aperture is limited and can not cover all space. A single beam director aperture can only cover part of the space around the aperture. For example, beam director apertures on the front, back and bottom of an aircraft can only respectively cover the areas in front of the airplane, in back of the aircraft, and below the aircraft. The physical limitations of known beam director apertures make it impossible to cover four (Π) radians of space around the beam director aperture.

However, there are many instances where it is desirable to cover the entire space around the beam director aperture. For example, a pilot may have to engage targets in the entire volume around the aircraft. Thus, typically multiple apertures are employed to cover more area. Known directed energy weapon systems include one laser engine for each aperture. Each laser engine includes a master oscillator and high power fiber amplifiers, which significantly increase the cost of the weapon system. It would be desirable to increase efficiency and decrease costs of directed energy systems, such as directed energy weapon systems, by supplying laser power from a single laser engine to multiple beam director apertures. It would further be desirable to provide the routing of laser power from a single laser engine to two or more beam director apertures simultaneously and/or sequentially.

BRIEF SUMMARY OF THE INVENTION

In one preferred embodiment, the present invention is directed to a multi-aperture fiber laser system. The multi-aperture fiber laser system includes a fiber amplifier laser engine that includes a tunable master oscillator. Additionally, the multi-aperture fiber laser system includes a wavelength selective beam router optically connected to the fiber amplifier laser engine and a plurality of beam directors optically connected to the wavelength selective beam router. The tunable master oscillator outputs a first optical signal selectively tuned to at least one specific wavelength. Each of the beam director assemblies is designed to direct, or manipulate, optical signals having one specific and unique wavelength. The wavelength selective beam router receives a plurality of second optical signals output from the fiber amplifier laser engine. Each of the second optical signals has the same at least one wavelength of the first optical signal. The wavelength selective beam router then routes each second optical signal to one of the beam director assemblies based on the wavelength of the second optical signals. Thus, the multi-aperture fiber laser system enables a single high power fiber amplifier laser engine to supply laser power to more than one beam director in a highly flexible and efficient manner.

The present invention also involves a method for selectively directing laser power to a plurality of beam director assemblies using a multi-aperture fiber laser system that includes a fiber amplifier laser engine, a wavelength selective beam router, and a plurality of beam director assemblies. The method includes selectively tuning an optical signal to at least one wavelength utilizing a tunable master oscillator included in the fiber amplifier laser engine, and utilizing the wavelength selective beam router to direct the optical signal to at least one of the beam director assemblies based on the at least one wavelength.

In another preferred embodiment a system is provided for selectively directing laser power. The system includes a fiber amplifier laser engine that includes a tunable master oscillator. Additionally, the system includes a controller that controls the tunable master oscillator and a wavelength selective beam router optically connected to the fiber amplifier laser engine. The tunable master oscillator outputs a first optical signal selectively tuned to at least one specific wavelength specified by the controller. The wavelength selective beam router receives a plurality of second optical signals output from the fiber amplifier laser engine. Each second optical signal has the same at least one wavelength of the first optical signal. The wavelength selective beam router then routes each second optical signal to one of a plurality of outputs based on the wavelength of the second optical signals.

BRIEF DESCRIPTION OF THE DRAWINGS

The present invention will become more fully understood from the detailed description and accompanying drawings, wherein.

DETAILED DESCRIPTION OF THE INVENTION

Figure 1:
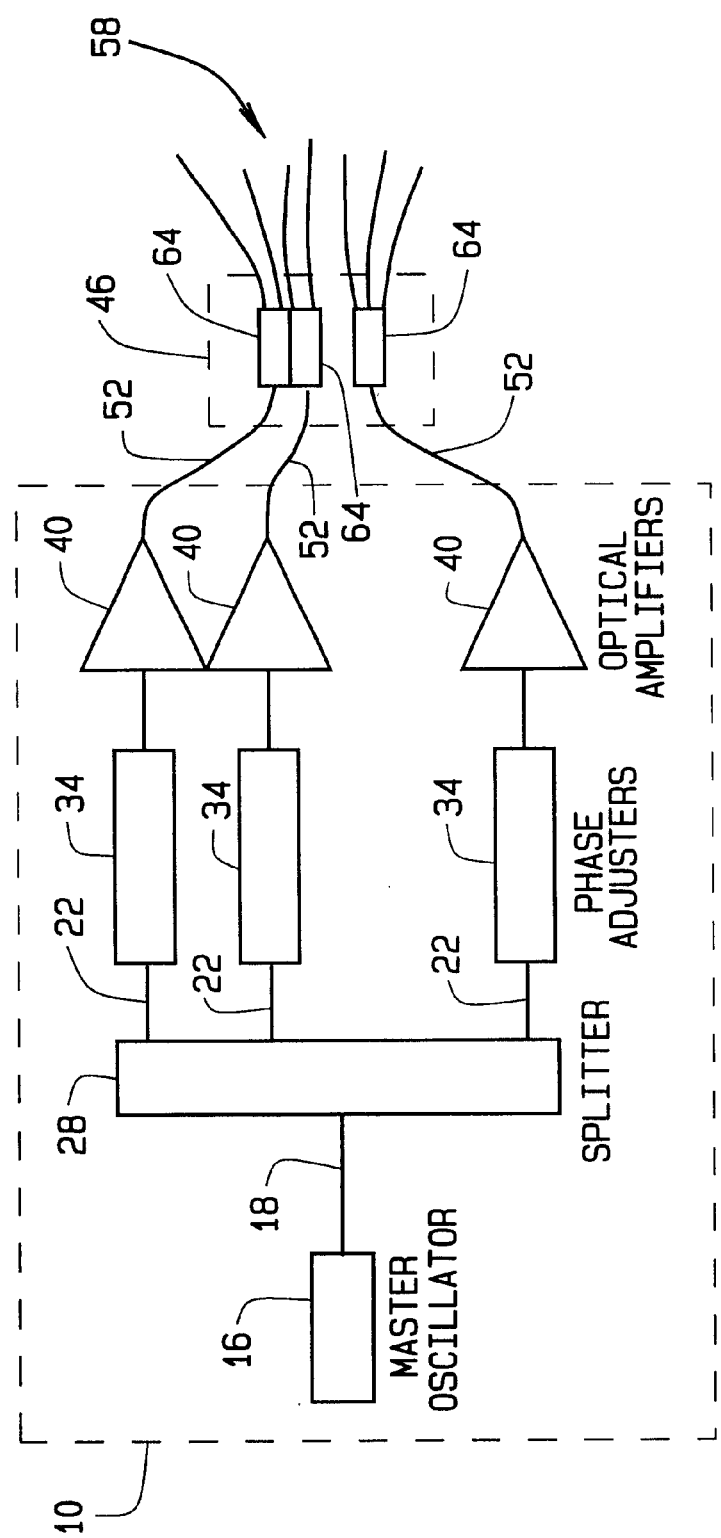
FIG. 1 is a schematic of a known dual clad fiber amplifier laser engine.

FIG. 1 is a schematic of a known dual clad fiber amplifier laser engine 10. Dual clad fiber (DCF) amplifier laser engines, such as laser engine 10, have significant potential for commercial and military applications. DCF amplifiers included in the laser engines are pumped by efficient laser diode bar arrays and achieve very high optical-to-optical conversion efficiency. As compact, modular, all-electric laser sources, DCF amplifier laser engines have attracted significant attention for both military and industrial applications. FIG. 1 shows the general concept for scaling fiber amplifier laser engine 10 up to high power. A master oscillator 16 generates an optical signal 18 with a specified wavelength that is preamplifier and split amongst many fiber beam lines 22 by a splitter 28. Each beam line 22 is connected to an in-line phase modulator 34 that can electronically adjust the phase of each line 22 through more than a full wave. Additionally, laser engine 10 includes a plurality of high power DCF amplifiers 40 optically connected to the phase modulators 34. The high power DCF amplifies 40 boost the signal to 100–1000 W while maintaining signal coherence.

The output of each DCF amplifier 40 is delivered to a beam director aperture, or assembly, 46 by a bundle of transport optical fibers 52 that are passive and exhibit very low loss. An output beam 58 is formed by an array of lenses 64 fed by the transport fibers 52, and a wavefront sensor (not shown) senses the phase of each fiber amplifier 40 output. A phase control system (not shown) uses this phase information to apply an appropriate control signal to each in-line phase modulator 34 to form the desired output beam 58. Laser engine 10 is described in detail in issued U.S. Pat. No. 5,694,408, filed Mar. 5, 1996, entitled Fiber Optic Laser System and Associated Lasing Method, herein incorporated by reference in its entirety.

Figure 2:
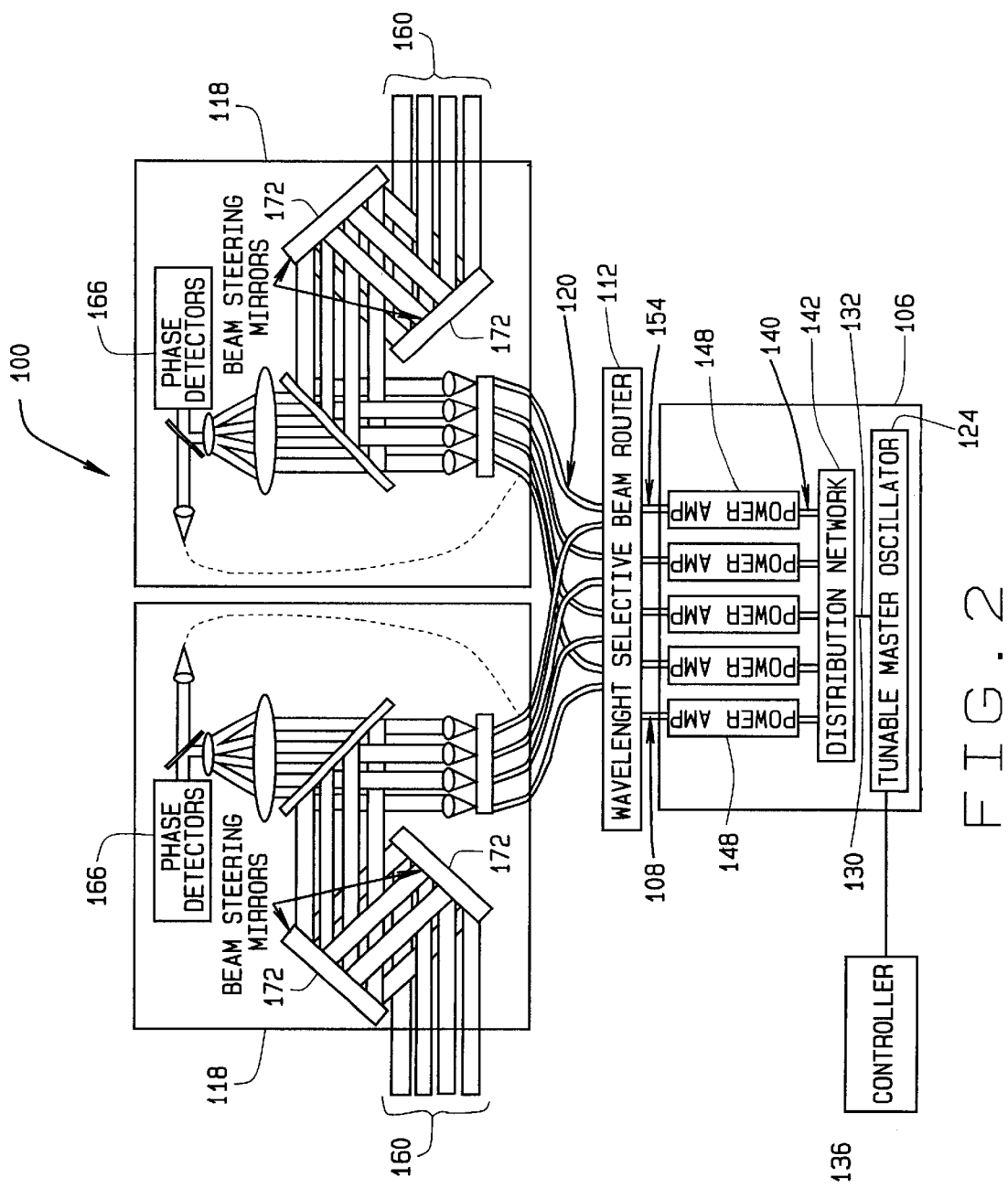
FIG. 2 is a schematic of a multi-aperture fiber amplifier laser system, in accordance with a preferred embodiment of the present invention.

FIG. 2 is a schematic of a multi-aperture fiber laser system 100 in accordance with a preferred embodiment of the present invention. System 100 includes a fiber amplifier laser engine 106 optically connected by a plurality of passive, low loss transport fibers 108 to a wavelength selective beam router 112. Beam router 112 is connected to a plurality of beam director apertures, or assemblies, 118 by a plurality of passive, low loss transport fibers 120. Fiber amplifier laser engine 106 is preferably a DCF amplifier laser engine, but can be any suitable fiber amplifier laser engine known in the art. Each beam director assembly 118 can be any assembly wherein an optical beam is monitored and directed, such as a beam director strategically placed about an aircraft to enhance effectiveness of a directed energy weapon platform, or a workstation placed about a shop floor in an industrial application. System 100 enables selective direction of laser power from laser engine 106 to one or more beam director assemblies 118, and provides the capability to switch the direction of laser power between beam director assemblies 118 at a high rate of speed.

Amplifier laser engine 106 includes a tunable master oscillator 124 that generates a first optical signal 130 having at least one specified wavelength. First optical signal 130 is transmitted via passive, low loss transport fiber, or fiber beam line, 132. Tunable master oscillator 124 is controlled by a controller 136 such that tunable master oscillator 124 tunes first optical signal 130 to the specific wavelength(s) as directed by controller 136. Controller 136 can be manually controlled by an operator or automatically controlled by a processor (not shown), for example a computer. Tunable master oscillator 124 may comprise any tunable oscillator known by those skilled in the art suitable for selectively tuning the wavelength of an optical signal. For example, piezoelectric elements can be used to adjust the laser cavity length of short cavity solid state lasers over the gain line width of the host material. Alternatively, distributed feedback laser diodes with multiple independently excited sections can be used to tune the wavelength of the optical signal. As a further example of a tunable master oscillator 124, several continuous laser sources, i.e. master oscillators, operating at different specific wavelengths can be switched sequentially through an appropriate discrete or photonic network into distribution a network 142 upon command.

First optical signal 130 is preamplifier and split amongst a plurality of passive, low loss fiber beam lines 140 by distribution network 142. Distribution network 142 electronically adjusts, or modulates, the phase of each optical signal transmitted via beam lines 140 such that each beam line 140 transmits an optical signal having the at least one wavelength of first optical signal 130 with a phase shift different from the optical signals transmitted via the other beam lines 140. Each beam line 140 is connected to one of a plurality of high power fiber amplifiers 148 that boosts each optical signal while maintaining signal coherence. In a preferred embodiment high power fiber amplifiers 148 comprise high power DCF amplifiers. Each fiber amplifier 148 outputs one of a plurality of second optical signals 154, that is delivered to wavelength selective beam router 112 via transport fibers 108.

Wavelength selective beam router 112 routes each second optical signal 154 to at least one specific output transport fiber 120 based on the precise wavelength of each second optical signal 154. Each beam director assembly 118 is configured to manipulate, or direct, optical signals having a specific and unique wavelength. Each transport fiber 120 terminates at one of the beam directors 118, where an output beam 160 is formed. Thus, wavelength selective beam router 112 routes each second optical signal 154 having a specific wavelength, as tuned by tunable master oscillator 142, to a particular beam director 118 configured to direct only optical signals having the same specific wavelength. For example, wavelength selective beam router 112 routes second optical signals having a wavelength of $\lambda_1$ to the beam director 118 that only directs optical signals having a wavelength of $\lambda_1$ while second optical signals having a wavelength of $\lambda_2$ are routed to the beam director 118 configured to direct optical signals having a wavelength of $\lambda_2$.

Wavelength selective beam router 112 may comprise any optical signal router known by those skilled in the art suitable for routing optical signals based on the wavelength of the signal. For example optical diffraction graters, holographic elements, and wavelength selective fiber couplers could each be employed for this purpose.

In operation, controller 136 directs tunable master oscillator 124 to generate first optical signal 132 having a wavelength of $\lambda_1$ for a desired period of time $t_1$. During that period of time $t_1$, wavelength selective beam router 112 routes second optical signal 154 to the beam director 118 configured to direct an optical signal having a wavelength of $\lambda_1$. Then controller 136 directs tunable master oscillator 124 to generate first optical signal 132 having a wavelength of $\lambda_2$ for a certain period of time $t_2$. During time $t_2$ wavelength selective beam router 112 routes second optical signal 154 to the beam director 118 configured to handle the optical signal with the wavelength of $\lambda_2$, and so on. Controller 136 can alter the wavelength tuned by tunable master oscillator 124 in any sequence and among as many wavelengths as there are beam director assemblies, or as the limitations of wavelength selective beam router 112 will allow.

An output wavefront 160 at an active beam director assembly 118 is measured by a phase detector 166 and directed by beam steering mirrors 172. Phase detector 166 of each beam director assembly 118 measures the phase of that particular output beam 160 and sends appropriate phase modulation commands back to distribution network 142 so that distribution network 142 will modulate the phase of the optical signal transmitted by each beam line 142 to form the desired output beam 160 at that particular beam director assembly 118. Changing the tunable master oscillator 124 wavelength from $\lambda_1$ to $\lambda_2$ results in output beam 160 switching from being formed at and radiated from one beam director assembly 118, to being formed at and radiated from another beam director assembly 118. Beam routing can be performed very fast and non-mechanically simply by shifting the tunable m aster oscillator 124 wavelength under the control of controller 136. Switching speeds for tunable master oscillator 124 can be very short, for example few nanoseconds, depending upon the limitations of tunable master oscillator 124.

In another preferred embodiment of the present invention, available laser power from laser engine 106 is shared by two or more beam director assemblies 118 relatively simultaneously. The tunable master oscillator 124 is time-multiplexed between two or more wavelengths such that for short periods of time, wavelength selective beam router 112 directs second signals 154 first to one beam director assembly 118 and then to another and back. While each beam director assembly 118 is active the near field phase can be sensed at each beam director assembly 118 and appropriate phase commands can be generated by phase detector 116 to form the desired output beam 160 for that particular beam director assembly 118. In this way, by managing the duty cycle for the plurality of active beam director assemblies 118, the available laser power from laser engine 106 can be shared and allocated as desired.

In yet another preferred embodiment, tunable master oscillator 124 generates first optical signal 130 having a plurality of wavelengths. Distribution network 142 separates first optical signal 130 into a plurality of sub-signals based on wavelength, modulates the phase of each sub-signal, and recombines the sub-signals based on phase shift. Thus, distribution network 142 independently and simultaneously controls the phase of each wavelength of the optical signals transmitted via beam lines 140. More particularly, each beam line 140 transmits an optical signal having the plurality of wavelengths of first optical signal 130 with each wavelength having an independent phase shift different from the independent phase shifts of the wavelengths of the optical signals transmitted via the other beam lines 140.

Wavelength selective beam router 112 then receives the second optical signals 154 from amplifiers 148, which have the same plurality of wavelengths as first optical signal 130. Wavelength selective beam router 112 then filters and divides each of the second optical signals 154 into a plurality of third optical signals such that each third optical signal has one of the plurality of wavelengths of second optical signal 154. The third optical signals are then simultaneously routed by wavelength selective beam router 112 to the appropriate beam director assemblies via transport fibers 120. Thus, laser power from laser engine 106 is simultaneously allocated among a plurality of beam director assemblies 118.

Figure 3:
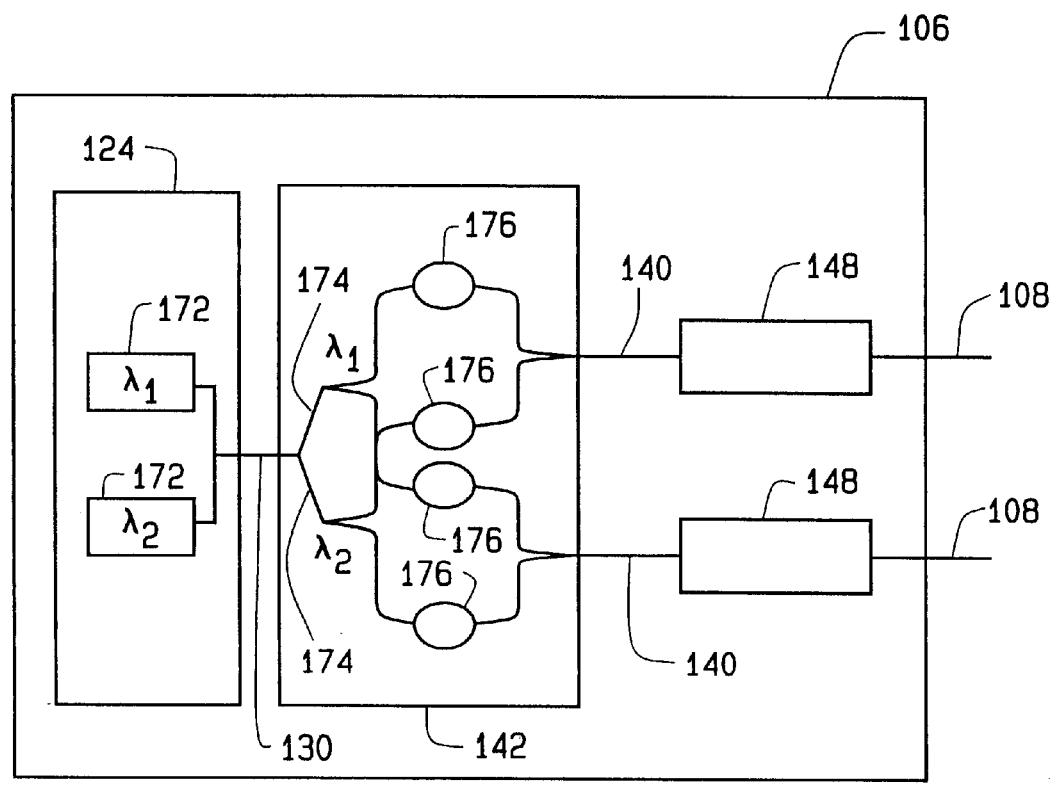
FIG. 3 is a preferred embodiment of a laser engine used in the multi-aperture fiber amplifier laser system shown in FIG. 2.

FIG. 3 shows a preferred embodiment of laser engine 106 used when tunable master oscillator 124 generates first optical signal 130 having a plurality of wavelengths, wherein distribution network 142 separates first optical signal 130 based on wavelength, modulates the phase of each wavelength, and recombines the signal based on phase shift. Tunable master oscillator 124 generates first optical signal 130 having a plurality of wavelengths, for example $\lambda_1$ and $\lambda_2$. Tunable master oscillator 124 is shown comprising two master oscillators 172, but could be configured in any suitable manner know in the art, as described above. First optical signal 130 is separated by distribution network 142 into a plurality of sub-signals 174 based on wavelength. The phase of each sub-signal is modulated by phase modulators 176, where after the sub-signals are recombined by distribution network 142 and transmitted to power amplifiers 148 via beam lines 140. Thus, each beam line 140 transmits an optical signal having the plurality of wavelengths of first optical signal 130, e.g. $\lambda_1$ and $\lambda_2$, and each wavelength has an independent phase shift different from the phase shifts of the optical signals transmitted via the other beam lines 140.

Figure 4:
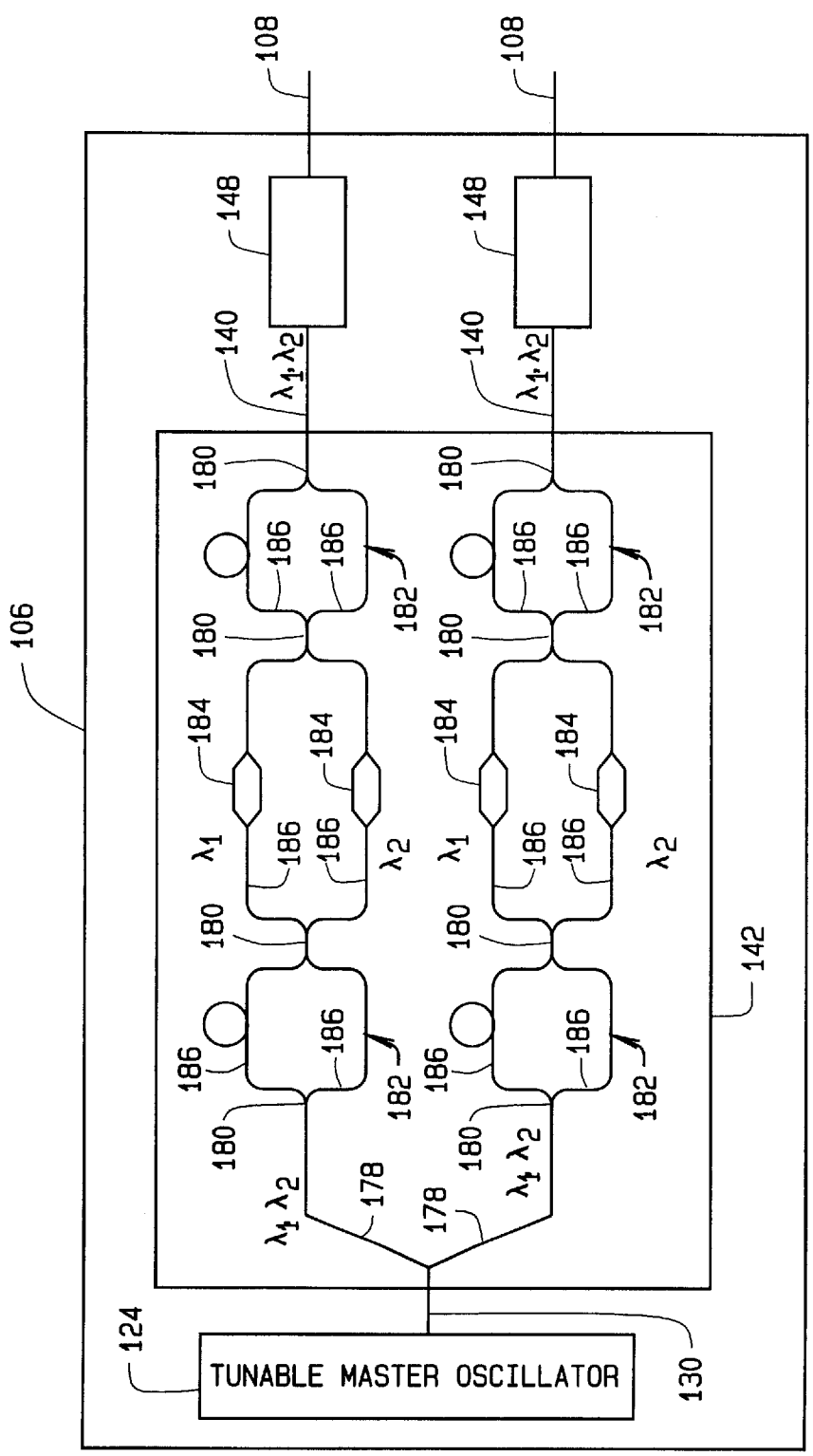
FIG. 4 is another preferred embodiment of the laser engine used in the multi-aperture fiber amplifier laser system shown in FIG. 2.

FIG. 4 shows another preferred embodiment of laser engine 106 used when tunable master oscillator 124 generates first optical signal 130 having a plurality of wavelengths, wherein distribution network 142 separates first optical signal 130 based on wavelength, modulates the phase of each wavelength, and recombines the signal based on phase shift. Tunable master oscillator 124 generates first optical signal 130 having a plurality of wavelengths. Distribution network 142 splits the first optical signal 130 into plurality of first sub-signals 178 such that each first sub-signal 178 has the plurality of wavelengths of first optical signal 130. Distribution network 142 then utilizes a plurality of 3 dB couplers 180, a plurality of unequal path Mach-Zehnder (MZ) fiber interferometers 182, and a plurality of phase modulators 184 to divide each first sub-signal 178 into a plurality of second sub-signals 186 based on wavelength, independently modulate the phase of each second sub-signal 186, and recombine the second sub-signals 186. The recombined second sub-signals 186 are then transmitted to amplifiers 148 via bean lines 140.

For example, tunable master oscillator outputs first optical signal 130 having wavelengths $\lambda_1$ and $\lambda_2$. Distribution network 142 then splits signal 130 into first sub-signals 178, each have the wavelengths $\lambda_1$ and $\lambda_2$. Each first sub-signal 178 is then input to one of the 3 dB couplers 180 that couples each sub-signal to one of the unequal path MZ fiber interferometers 182. Utilizing the unequal path lengths of each unequal path MZ fiber interferometer 182 each first sub-signal 178 is split into second sub-signals 186 such that each second sub-signal 186 has one discrete wavelength and phase shift. Each second sub-signal 186 is then input to one of the phase modulators 184 via another 3 dB coupler 180. Based on feedback from each beam director assembly 118 (shown in FIG. 2), phase modulators 184 adjust the phase of each second sub-signal 186. Each second sub-signal 186 is then input to another unequal path MZ fiber interferometer 182, via another 3 dB coupler 180, wherein the second sub-signals 186 are recombined and input to amplifiers 148. Thus, each beam line 140 transmits an optical signal having the plurality of wavelengths of first optical signal 130, e.g. $\lambda_1$ and $\lambda_2$, and each wavelength has an independent phase shift different from the phase shifts of the optical signals transmitted via the other beam lines 140.

As described above, system 100 utilizes a single laser engine 106 to provide laser power to a plurality of beam director assemblies 118. Tunable master oscillator 124 enables laser engine 106 to output optical signals having at least one specific wavelength. Then based on the wavelength (s), the output signals of laser engine 106 are routed by wavelength selective beam router 112 to at least one of beam director assemblies 118. Additionally, system 100 can sequentially or simultaneously allocate laser power among the plurality of beam director assemblies 118.

While the invention has been described in terms of various specific embodiments, those skilled in the art will recognize that the invention can be practiced with modification within the spirit and scope of the claims.

What is claimed is:

1. A multi-aperture fiber laser system comprising:
   a fiber amplifier laser subsystem configured to generate a plurality of optical signals having at least one common wavelength, said fiber amplifier laser subsystem comprising a tunable master oscillator, a distribution network and at least one power amplifier;
   a wavelength selective beam router optically coupled to said fiber amplifier laser subsystem and configured to route each of the optical signals to at least one of a plurality of output transport fibers; and
   a plurality of beam directors optically coupled to said wavelength selective beam router, via the output transport fibers, and configured to direct at least one of the optical signals based on the wavelength of the optical signal.

2. The system of claim 1, wherein each said beam director is further configured to direct only optical signals having one specific wavelength such that each of the optical signals output by the selective beam router are directed only by the beam director configured to direct optical signals having the wavelength of the respective optical signal.

3. The system of claim 1, wherein said tunable master oscillator is configured to output a first optical signal tuned to at least one specific wavelength.

4. The system of claim 3, wherein said system further comprises a controller configured to control the at least one specific wavelength at which said tunable master oscillator tunes said first optical signal.

5. The system of claim 3, wherein the plurality of optical signals generated by said fiber amplifier laser subsystem comprise a plurality of second optical signals having the at least one specific wavelength of said first optical signal.

6. The system of claim 5, wherein said wavelength selective beam router is further configured to route each said second optical signal to at least one of said beam directors based on the at least one wavelength of each said second optical signal.

7. The system of claim 5, wherein said first optical signal is tuned to have a plurality of specific wavelengths, and wherein said fiber amplifier laser subsystem comprises distribution network configured to independently and simultaneously control the phase of each wavelength of said first optical signals.

8. The system of claim 7 wherein said second optical signals have the plurality of specific wavelengths of said first optical signal, and said selective beam router is configured to:
divide each said second optical signal into a plurality of third optical signals, wherein each said third optical signal has one of the plurality of wavelengths of said second optical signal; and
simultaneously route each said third optical signal to one of said beam directors based on the wavelength of each said third optical signal.

9. A method for selectively directing laser power in multiple directions using a multi-aperture fiber laser system said method comprising:
selectively tuning an optical signal to at least one wavelength utilizing a tunable master oscillator included in a fiber amplifier subsystem;
outputting from the fiber amplifier subsystem a plurality of optical signals having the at least one wavelength; and utilizing a wavelength selective beam router to direct each of the optical signals output from the fiber amplifier subsystem to at least one of a plurality of beam directors based on the at least one wavelength.

10. The method of claim 9, wherein selectively tuning an optical signal further comprises tuning a first optical signal output by the tunable master oscillator to at least one specific wavelength using the tunable master oscillator.

11. The method of claim 10, wherein selectively tuning an optical signal further comprises controlling the wavelength to which the tunable master oscillator tunes the first optical signal utilizing a controller.

12. The method of claim 10, wherein outputting from the fiber amplifier subsystem a plurality of optical signals comprises outputting a plurality of second optical signals from the fiber amplifier laser subsystem, the second optical signals having the at least one specific wavelength of the first optical signal.

13. The method of claim 12, wherein utilizing a wavelength selective beam router to direct each of the optical signals comprises adapting each of the beam directors to manipulate optical signals having one specific wavelength.

14. The method of claim 13, wherein utilizing a wavelength selective beam router to direct each of the optical signals further comprises utilizing the wavelength selective beam router to route each of the second optical signals to the beam director adapted to direct optical signals having the wavelength of the respective second optical signal.

15. The method of claim 12, wherein utilizing a wavelength selective beam router to direct each of the optical signals further comprises:
tuning the first optical signal to have a plurality of specific wavelengths using the tunable master oscillator; and
independently and simultaneously controlling the phase of each wavelength of the first optical signal utilizing a distribution network included in the fiber amplifier laser subsystem.

16. The method of claim 15, wherein utilizing a wavelength selective beam router to direct each of the optical signals further comprises:
outputting the second optical signals having the plurality of specific wavelengths of the first optical signal;
utilizing the wavelength selective beam router to divide the second optical signals into a plurality of third optical signals wherein each third optical signal has one of the plurality of specific wavelengths of the second optical signals; and
routing each of the third optical signals to one of the beam directors based on the wavelength of the third optical signal.

17. A system for selectively directing laser power from a single source among a plurality of beam directors, said system comprising:
a fiber amplifier laser subsystem configured to generate a plurality of optical signals having at least one common wavelength, said fiber amplifier laser subsystem comprising a tunable master oscillator, a distribution network and at least one power amplifier;
controller configured to control said tunable master oscillator; and
a wavelength selective beam router optically coupled to said fiber amplifier laser subsystem and configured to route each of the optical signals to at least one of a plurality of output ports,
wherein said wavelength selective beam router is optically coupled to the plurality of beam directors.

18. The system of claim 17, wherein said tunable master oscillator is configured to output a first optical signal tuned to at least one specific wavelength by said tunable master oscillator.

19. The system of claim 18, wherein the plurality of optical signals generated by said fiber amplifier laser subsystem comprise a plurality of second optical signals having the at least one specific wavelength of said first optical signal.

20. The system of claim 19, wherein:
each said optical port is configured to be optically coupled to one of the beam directors; and
said wavelength selective beam router further configured to route said second optical signals to at least one of said optical output ports based on the at least one wavelength of said second optical signals.

21. The system of claim 20, wherein said first optical signal is tuned to have a plurality of specific wavelengths, and wherein said fiber amplifier laser subsystem comprises a distribution network configured to independently and simultaneously control the phase of each wavelength of said first optical signals.

22. The system of claim 21, wherein said second optical signals have the plurality of specific wavelengths of said first optical signal, and said selective beam router is configured to:

divide each said second optical signal into a plurality of third optical signals, wherein each said third optical signal has one of the plurality of wavelengths of said second optical signal; and simultaneously route each said third optical signal to one of said optical outputs ports based on the wavelength of said third optical signal.

* * * * *